(12) United States Patent
Kashiwagi

(10) Patent No.: US 10,770,095 B2
(45) Date of Patent: Sep. 8, 2020

(54) RECORDING DENSITY SETTING METHOD BASED ON LINEAR RECORDING DENSIT AND TRACK PITCH LIMITING

(71) Applicants: Kabushiki Kaisha Toshiba, Minato-ku, Tokyo (JP); Toshiba Electronic Devices & Storage Corporation, Minato-ku, Tokyo (JP)

(72) Inventor: Kazuto Kashiwagi, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/286,926

(22) Filed: Feb. 27, 2019

(65) Prior Publication Data

US 2020/0043521 A1  Feb. 6, 2020

(30) Foreign Application Priority Data

Aug. 2, 2018  (JP) ................. 2018-146058

(51) Int. Cl.
| | | |
|---|---|---|
| *G11B 5/012* | (2006.01) | |
| *G11B 5/82* | (2006.01) | |
| *G11B 5/09* | (2006.01) | |
| *G11B 20/12* | (2006.01) | |
| *G11B 20/18* | (2006.01) | |
| *G11B 5/54* | (2006.01) | |

(52) U.S. Cl.
CPC ............. *G11B 5/012* (2013.01); *G11B 5/82* (2013.01); *G11B 5/09* (2013.01); *G11B 5/54* (2013.01); *G11B 20/12* (2013.01); *G11B 20/1205* (2013.01); *G11B 20/1209* (2013.01); *G11B 20/1803* (2013.01)

(58) Field of Classification Search
None
See application file for complete search history.

(56) References Cited

U.S. PATENT DOCUMENTS

| | | | | |
|---|---|---|---|---|
| 6,078,460 A * | 6/2000 | Moriya | ................ | G11B 5/5534 360/77.04 |
| 7,403,353 B2 * | 7/2008 | Tagami | ................. | B82Y 10/00 360/135 |
| 7,463,438 B2 * | 12/2008 | Kosugi | .............. | G11B 5/59633 360/31 |
| 9,082,458 B1 | 7/2015 | Tang | | |
| 9,099,103 B1 * | 8/2015 | Krichevsky | ............ | G11B 5/012 |

(Continued)

*Primary Examiner* — Tan X Dinh
(74) *Attorney, Agent, or Firm* — White & Case LLP (57) ABSTRACT

According to one embodiment, a recording density setting method includes performing first process and performing second process. The first process including recording and reading data on and from a disk medium of a magnetic disk device, and acquiring first information for setting the read data to satisfy a certain quality criterion. The first information represents a first shape of a first plurality of unit regions. Each of the a first plurality of unit regions is a recording region of a unit capacity. The second process includes acquiring second information representing a second shape of the first plurality of unit regions, and setting a recording density on the basis of the second information. The second shape is formed by adding margin regions having the same area to the first plurality of unit regions of the first shape.

9 Claims, 9 Drawing Sheets (56) References Cited

U.S. PATENT DOCUMENTS

| | | | |
|---|---|---|---|
| 9,230,605 B1 | 1/2016 | Moser et al. | |
| 9,330,688 B1 | 5/2016 | Zhu et al. | |
| 2009/0225473 A1* | 9/2009 | Takeshita | B82Y 10/00 360/135 |
| 2010/0134916 A1* | 6/2010 | Kawabe | B82Y 10/00 360/75 |
| 2011/0149437 A1* | 6/2011 | Kashiawagi | B82Y 10/00 360/110 |
| 2013/0279039 A1* | 10/2013 | Shiroishi | G11B 20/1217 360/48 |
| 2015/0294690 A1* | 10/2015 | Kanamaru | G11B 27/36 360/31 |

* cited by examiner

RECORDING DENSITY SETTING METHOD BASED ON LINEAR RECORDING DENSIT AND TRACK PITCH LIMITING

CROSS-REFERENCE TO RELATED APPLICATIONS

This application is based upon and claims the benefit of priority from Japanese Patent Application No. 2018-146058, filed on Aug. 2, 2018; the entire contents of which are incorporated herein by reference.

FIELD

Embodiments described herein relate generally to a recording density setting method and a magnetic disk device.

BACKGROUND

There are demands for a disk medium to increase the density at which data is recorded thereon, in order to increase the capacity of a magnetic disk device.

A recording density is defined by, for example, a combination of a linear recording density and a track density. The quality of a magnetic disk device is affected by settings of the linear recording density and the track density.

DETAILED DESCRIPTION

In general, according to one embodiment, a recording density setting method includes performing first process and performing second process. The first process including recording and reading data on and from a disk medium of a magnetic disk device, and acquiring first information for setting the read data to satisfy a certain quality criterion. The first information represents a first shape of a first plurality of unit regions. Each of the a first plurality of unit regions is a recording region of a unit capacity. The second process includes acquiring second information representing a second shape of the first plurality of unit regions, and setting a recording density on the basis of the second information. The second shape is formed by adding margin regions having the same area to the first plurality of unit regions of the first shape.

Exemplary embodiments of a recording density setting method and a magnetic disk device will be explained below in detail with reference to the accompanying drawings. The present invention is not limited to the following embodiments.

First Embodiment

Figure 1:
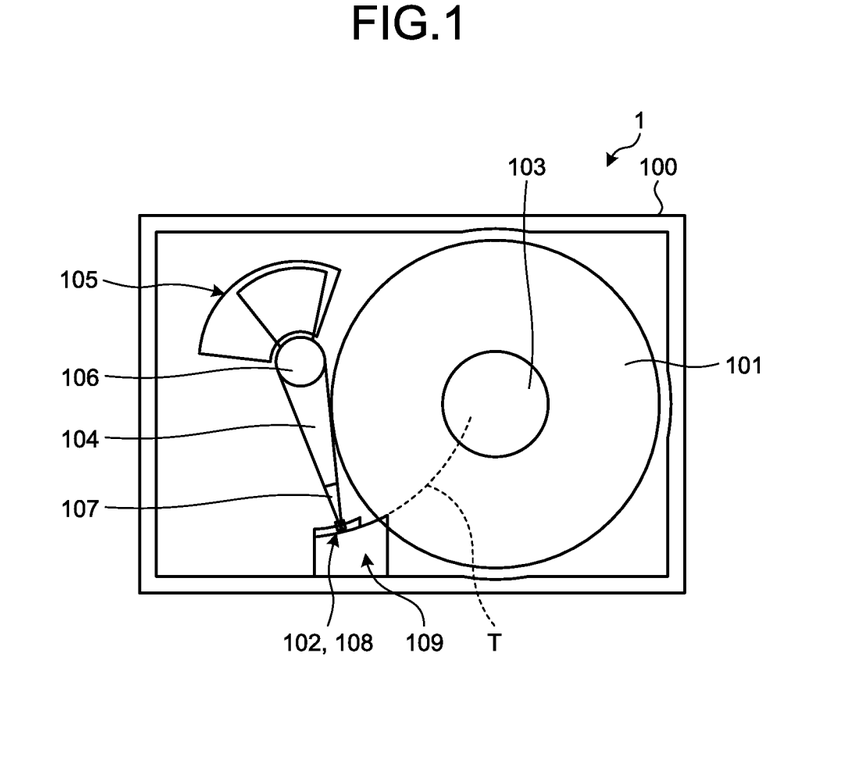
FIG. 1 is a diagram illustrating an example of a configuration of a magnetic disk device according to a first embodiment.
Figure 2:
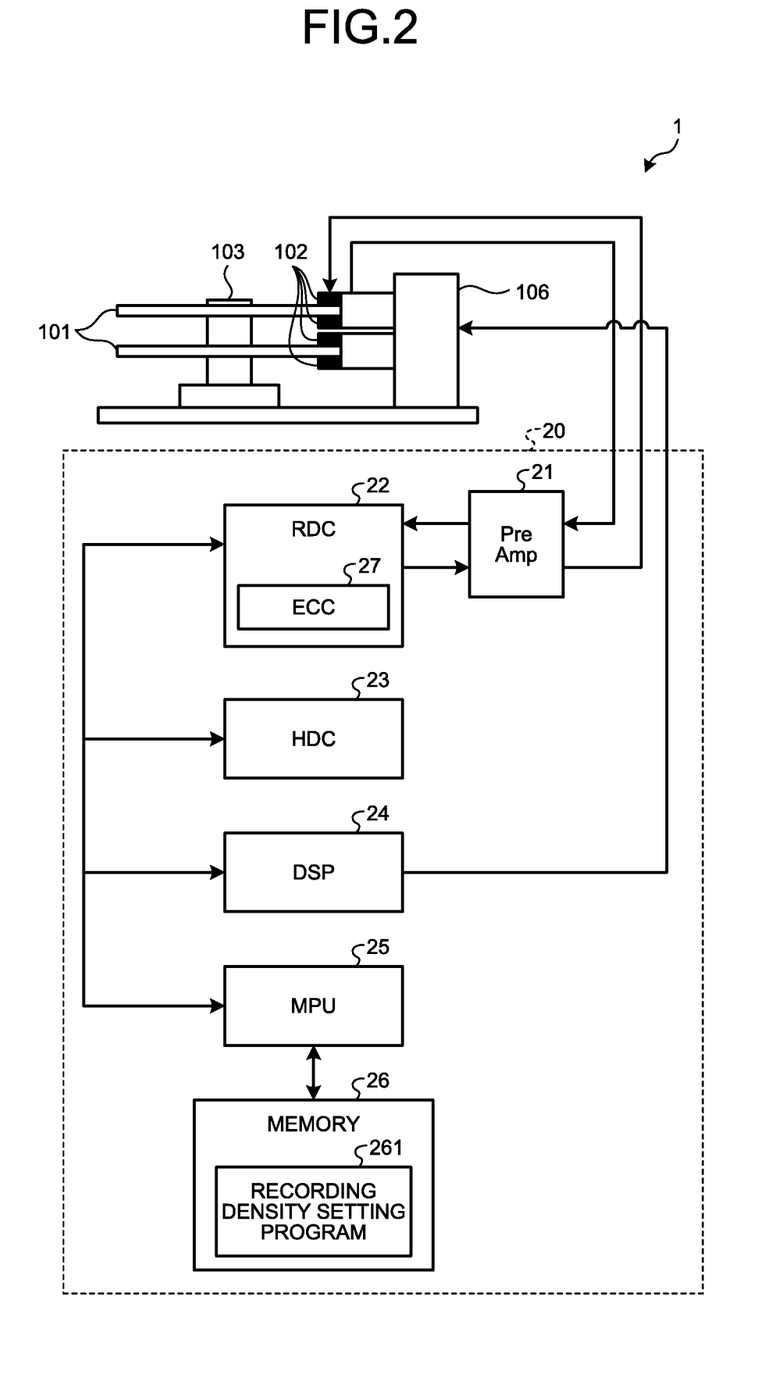
FIG. 2 is a diagram illustrating an example of a configuration of the magnetic disk device according to the first embodiment.

FIGS. 1 and 2 are diagrams illustrating an example of the configuration of a magnetic disk device according to a first embodiment. FIG. 1 illustrates the inside of a housing 100 of a magnetic disk device 1 with a top cover removed. As illustrated in FIG. 1, the magnetic disk device 1 includes disk mediums 101 and magnetic heads 102 that read and write data.

The disk medium 101 (a first disk medium 101) illustrated in FIG. 1 is one of two disk mediums 101, and the other disk medium (a second disk medium 101 (see FIG. 2) is located on the back side (a far side in FIG. 1) of the first disk medium 101. In the present embodiment, the number of the disk mediums 101 is exemplified as two, but the number of the disk mediums 101 may be one or three or more.

The two disk mediums 101 are attached at a certain pitch along a rotating shaft 103 of a spindle motor, and rotate integrally with the rotating shaft 103 at the same rotation speed.

The magnetic heads 102 are each attached to a leading end of an arm 104. The arm 104 is driven by a voice coil motor (VCM) 105 and rotates within a set range around a shaft 106 in both positive and negative directions. By this operation, the magnetic head 102 moves on a broken line T and is positioned on any of tracks of the disk medium 101 in the radial direction. Total four sets of head units each including the magnetic head 102 and the arm 104 are mounted on the disk mediums 101, i.e., one set each on the front surfaces and the back surfaces of the two disk mediums 101. The head units can be specified by a head number.

Specifically, each magnetic head 102 is mounted on a head slider 108 at the edge of a suspension 107 placed at the leading end of the arm 104. The magnetic head 102 includes a read element and a write element, and the read element scans and reads data from an intended surface of the disk medium 101, and the writ element writes data onto the intended surface of the disk medium 101. In other words, the magnetic head 102 accesses the recording surface of the disk medium 101. In the example illustrated in FIG. 1, the magnetic head 102 records and reads data onto and from the front surface of the first disk medium 101.

In addition, the magnetic disk device 1 includes a ramp load mechanism 109 that moves the magnetic head 102 away from the disk medium 101 for parking.

The magnetic disk device 1 includes a control circuit 20 (see FIG. 2) that controls the respective elements of the magnetic disk device 1, at the bottom, i.e., on the far side in FIG. 1. The control circuit 20 communicates with a host (not illustrated) via an interface such as a connection pin, which is attached to the housing 100 of the magnetic disk device 1 for external connection, and controls the respective elements of the magnetic disk device 1 in response to commands from the host.

Figure 3:
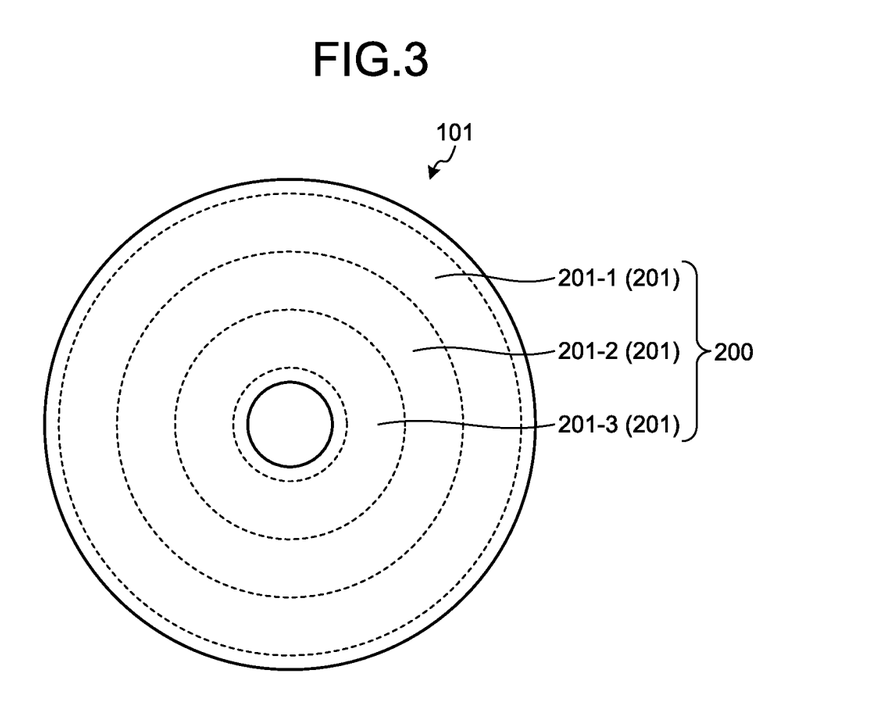
FIG. 3 is a diagram for illustrating a recording surface of a disk medium 101 in the first embodiment.

FIG. 3 is a diagram for illustrating the recording surface of the disk medium 101 of the first embodiment. The front surface and the back surface of the disk medium 101 include recording surfaces 200. FIG. 3 illustrates one of the front surface and the back surface of the disk medium 101. The recording surfaces 200 are each divided into a plurality of concentric zones 201 about the center of rotation of the disk medium 101. For the sake of simplicity, the zones 201 are exemplified by three zones 201-1, 201-2, and 201-3 as illustrated in FIG. 3. The number of zones 201 of a single recording surface 200 is not limited to three.

Each zone 201 includes concentric tracks about the center of rotation of the disk medium 101. Each track includes a plurality of consecutive sectors in a circumferential direction. Each sector has a magnetic region, and data is rewritable thereto. Each zone 201 may be identified, for example, by a combination of a head number of the magnetic head 102 and a zone number.

Figure 4:
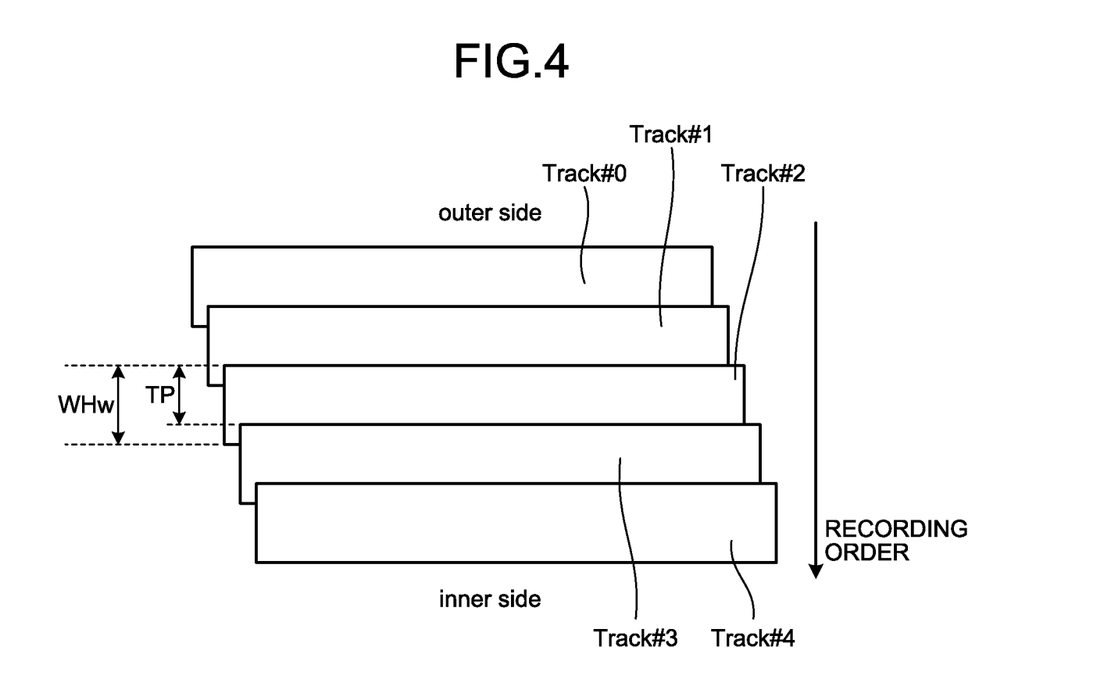
FIG. 4 is a diagram for illustrating an example of data recording in each zone 201 in the first embodiment.

FIG. 4 is a diagram for illustrating an example of data recording on each zone 201 in the first embodiment. Data is recorded on each zone 201 by shingled magnetic recording (SMR). SMR is a data recording technique that allows adjacent tracks to be layered on top of each other. It can be seen from FIG. 4 that according to SMR, a track pitch (TP) is narrower than a core width (WHw) of the write element of the magnetic head 102. SMR enables reduction in the track pitch and improvement in the recording density.

FIG. 4 illustrates the respective tracks when data is recorded from radially outside to inside the disk medium 101. The recording direction is not limited thereto. The recording may be performed from the inside toward the outside of the disk medium 101.

The qualities of the disk medium 101 and the magnetic head 102 vary depending on manufacturing variations. According to the magnetic disc device 1 of FIG. 2, the recording surfaces (front surface and back surface) of the disk mediums 101 are accessed by the four corresponding magnetic heads 10. Thus, at the same recording density set to all the recording surfaces, the recording quality varies depending on a position. The variation in the recording quality appears as a variation in bit error rate. In view of this, the recording density is adjusted by dividing the entire recording surface into a plurality of partial regions and individually setting the recording density for each partial region.

The zones 201 correspond to the partial regions for the recording density adjustment. In other words, the recording density is individually set or decided for the zones 201. Such setting, as dividing each of the front surfaces and the back surfaces of the disk mediums 101 and into the multiple zones 201 and setting the recording density for each zone 201, is known as a zone constant angular velocity (CAV) mode.

The recording density is specified by a combination of the linear recording density and the track density as described above. The linear recording density refers to a recording density of the disk medium 101 in the circumferential direction. The track density refers to a recording density of the disk medium 101 in the radial direction. For example, the linear recording density can be represented in unit of bits per inch (BPI). For example, the track density can be represented in unit of tracks per inch (TPI). Units representing both densities are not limited thereto.

In the first embodiment, the linear recording density and the track density of each zone 201 are set on the basis of an areal margin of a recording region per bit on the disk medium 101. The areal margin refers to an amount found by multiplying a track pitch margin by a bit pitch and corresponds to the area of a margin region. The track pitch margin refers to an amount found by subtracting a first track pitch from a second track pitch. The first track pitch is a track pitch required to ensure a minimum quality. The first track is referred to as a track pitch limit. The second track pitch is a track pitch decided by a set value of the track density. The track pitch margin may also be referred to as a track density margin or a TPI margin.

Figure 5:
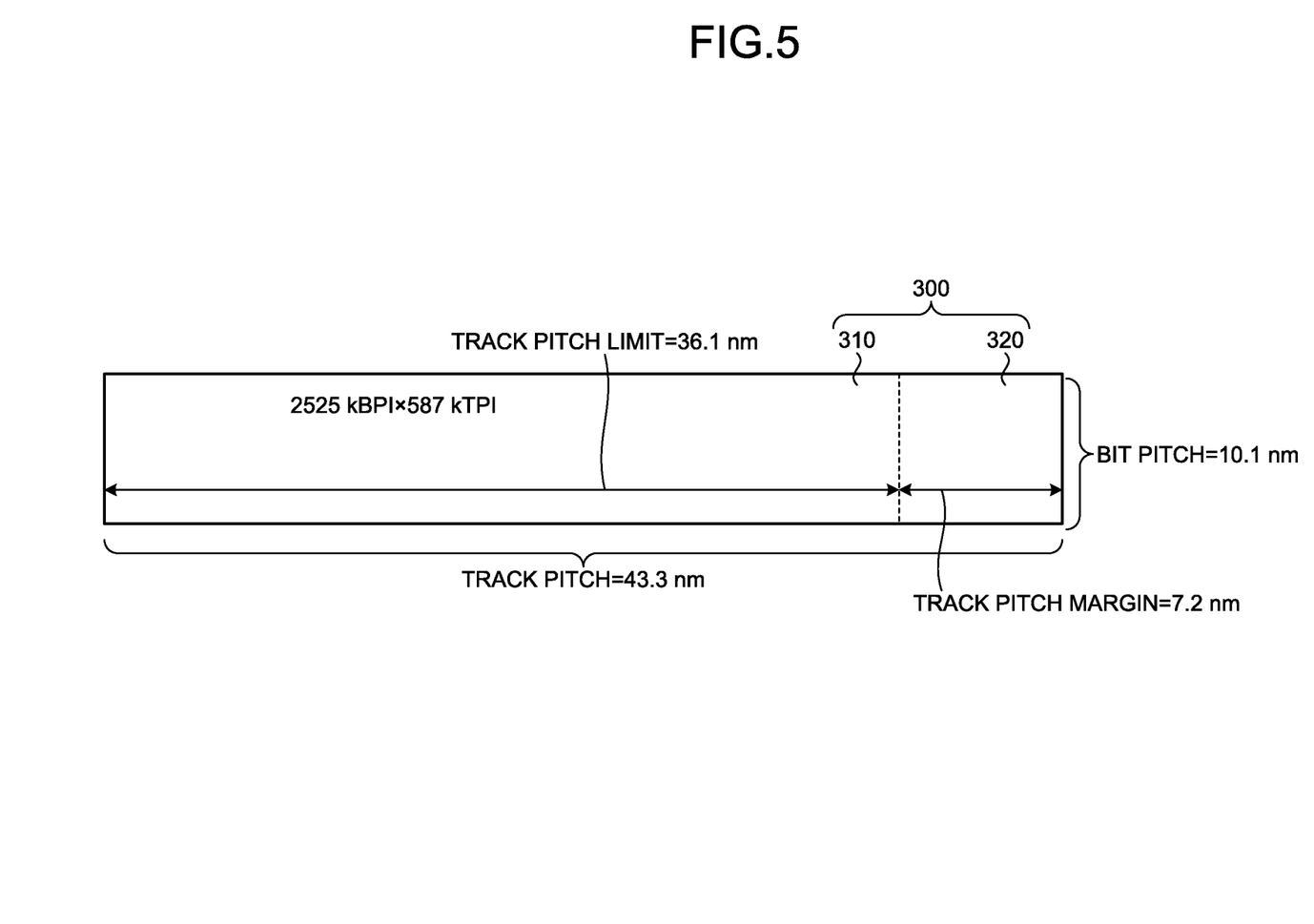
FIG. 5 is an exemplary diagram for illustrating an areal margin of a recording region per bit in the first embodiment.

FIG. 5 is an exemplary diagram for illustrating the areal margin of the recording region per bit in the first embodiment. For example, when the linear recording density is set to 2525 kBPI, and the track density is set to 587 kTPI, the recording region per bit has a substantially rectangular shape (a rectangle 300) defined by a bit pitch of about 10.1 nm and a track pitch of about 43.3 nm. When the track pitch limit is 36.1 nm, the track pitch margin is about 7.2 nm (=43.3 nm−36.1 nm). Thus, the areal margin, that is, the area of the margin region indicated by a rectangle 320 is about 72 nm$^2$ (=7.2 nm×10.1 nm).

In this specification, the recording region per bit is referred to as a unit region. A shape of a unit region including no areal margin, that is, a shape for ensuring the minimum quality is referred to as a first shape. A shape of a unit region set by adding a region (margin region) corresponding to the areal margin to the unit region of the first shape is referred to as a second shape. In the example illustrated in FIG. 5, a rectangle 310 defined by the bit pitch and the track pitch limit corresponds to the first shape, and the rectangle 300 defined by the bit pitch and the track pitch obtained by adding the track pitch margin to the track pitch limit corresponds to the second shape.

In the first embodiment, the linear recording density and the track density of each zone 201 are set such that the areal margins become as uniform as possible among the unit regions, and each areal margin is as large as possible. A method of setting the linear recording density and the track density will be described later in detail.

FIG. 2 illustrates an example of the configuration of the control circuit 20 of the magnetic disk device 1 according to the first embodiment. As illustrated in FIG. 2, the control circuit 20 includes a pre-amplifier (PreAmp) 21, a read channel circuit (RDC) 22, a hard disk controller (HDC) 23, a digital signal processor (DSP) 24, a micro processing unit (MPU) 25, and a memory 26.

The pre-amplifier 21 amplifies and outputs a signal read from the disk medium 101 by the magnetic head 102 (read element), and supplies the amplified signal to the RDC 22. Further, the pre-amplifier 21 amplifies a signal from the RDC 22 and supplies the amplified signal to the magnetic head 102 (write element).

The RDC 22 includes an error correction circuit (ECC) 27 that performs data encoding and decoding for error correction. The RDC 22 encodes data to be recorded on the disk medium 101 by the ECC 27 and supplies the encoded data to the pre-amplifier 21 as a signal. Further, the RDC 22 allows the ECC 27 to decode the signal read from the disk medium 101 and supplied from the pre-amplifier 21 for error detection and correction. Then, the RDC 22 outputs the error-corrected signal to the HDC 23 as digital data.

The data encoding and decoding for error correction by the ECC 27 is not limited to a specific method. As one example, low density parity check (LDPC) may be employed. Data block size serving as unit of encoding and decoding by the ECC 27 is not limited to a specific size. The ECC 27 may perform encoding and decoding in unit of sectors or in unit of tracks. The ECC 27 may perform encoding/decoding both in units of sectors and in units of tracks. The MPU 25 may perform either encoding or decoding for error correction.

The DSP 24 controls the spindle motor and the VCM 105 to perform positioning control such as seeking and following. Specifically, the DSP 24 performs the positioning control by obtaining and demodulating servo information from the signal from the RDC 22 and calculating a VCM drive command value according to an error between a position demodulated from the servo information and a target position.

The HDC 23 is connected to the host via a certain interface, and communicates with the host. A standard to which the interface conforms is not limited to a specific standard. The HDC 23 receives data from the RDC 22 and transfers the data to the host. Further, the HDC 23 receives data from the host and outputs the data to the RDC 22.

The MPU 25 analyzes a command received from the host by the HDC 23 to monitor a state of the magnetic disk device 1 and control the respective elements of the magnetic disk device 1.

The memory 26 is a data rewritable storage device. The memory 26 functions as a storage region for programs and various kinds of management information used for various kinds of processing executed by the MPU 25, a buffer region, and a cache region, for example. The memory 26 includes a volatile memory, a non-volatile memory, or a combination thereof. The volatile memory may be, for example, a static random access memory (SRAM) or a dynamic random access memory (DRAM). The non-volatile memory may be a flash memory.

In the first embodiment, the memory 26 stores a recording density setting program 261 for setting the recording density. The MPU 25 executes the recording density setting program 261 stored in the memory 26 to set the recording density (that is, a pair of the set value of the linear recording density and the set value of the track density) for each zone 201.

The set recording density for each zone 201 is stored in a non-volatile memory region of the magnetic disk device 1. After shipment of the magnetic disk device 1, the control circuit 20 controls access to the disk medium 101 in accordance with the recording density of each zone 201 stored in the non-volatile memory region.

The non-volatile memory region in which the set recording density for each zone 201 is stored is not limited to a specific region. For example, it may be a non-volatile memory of the memory 26 or a certain region on the disk medium 101. For example, the disk medium 101 may include a conventional magnetic recording (CMR) region in which data is recorded by CMR so as to avoid tracks from overlapping, to store the set recording density for each zone 201 in the CMR region.

After the recording density is set, the recording density setting program 261 may be or may not be deleted from the memory 26.

Figure 6:
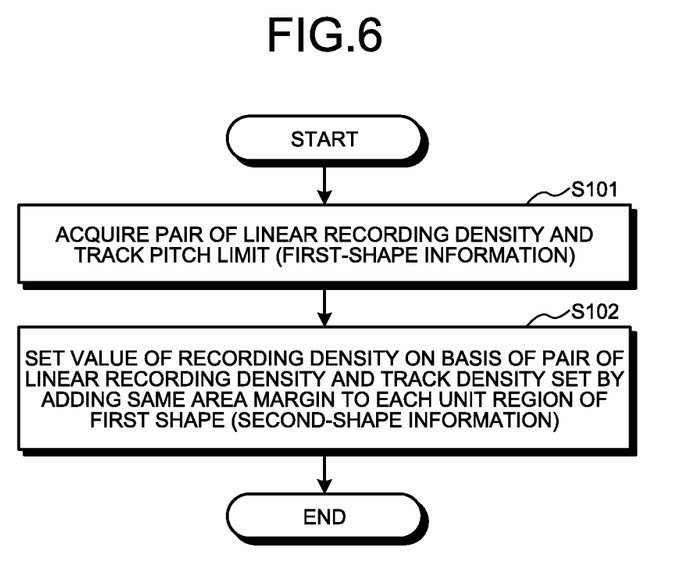
FIG. 6 is a flowchart for illustrating an overview process for deciding a recording density in the first embodiment.

FIG. 6 is a flowchart for describing an overview of a recording density setting process of the first embodiment.

First, the MPU 25 acquires a pair of linear recording density and track pitch limit as information on the first shape (first information) (S101).

A plurality of values of the linear recording density covering a settable range is prepared in advance. In S101, the MPU 25 measures the track pitch limit for each of the plurality of values of the linear recording density.

In S101, the MPU 25 measures the track pitch limit for each value of the linear recording density in each zone 201. In other words, the first information represents information containing a pair (a pair of linear recording density and track pitch limit) for each value of the linear recording density and for each zone 201.

Figure 7:
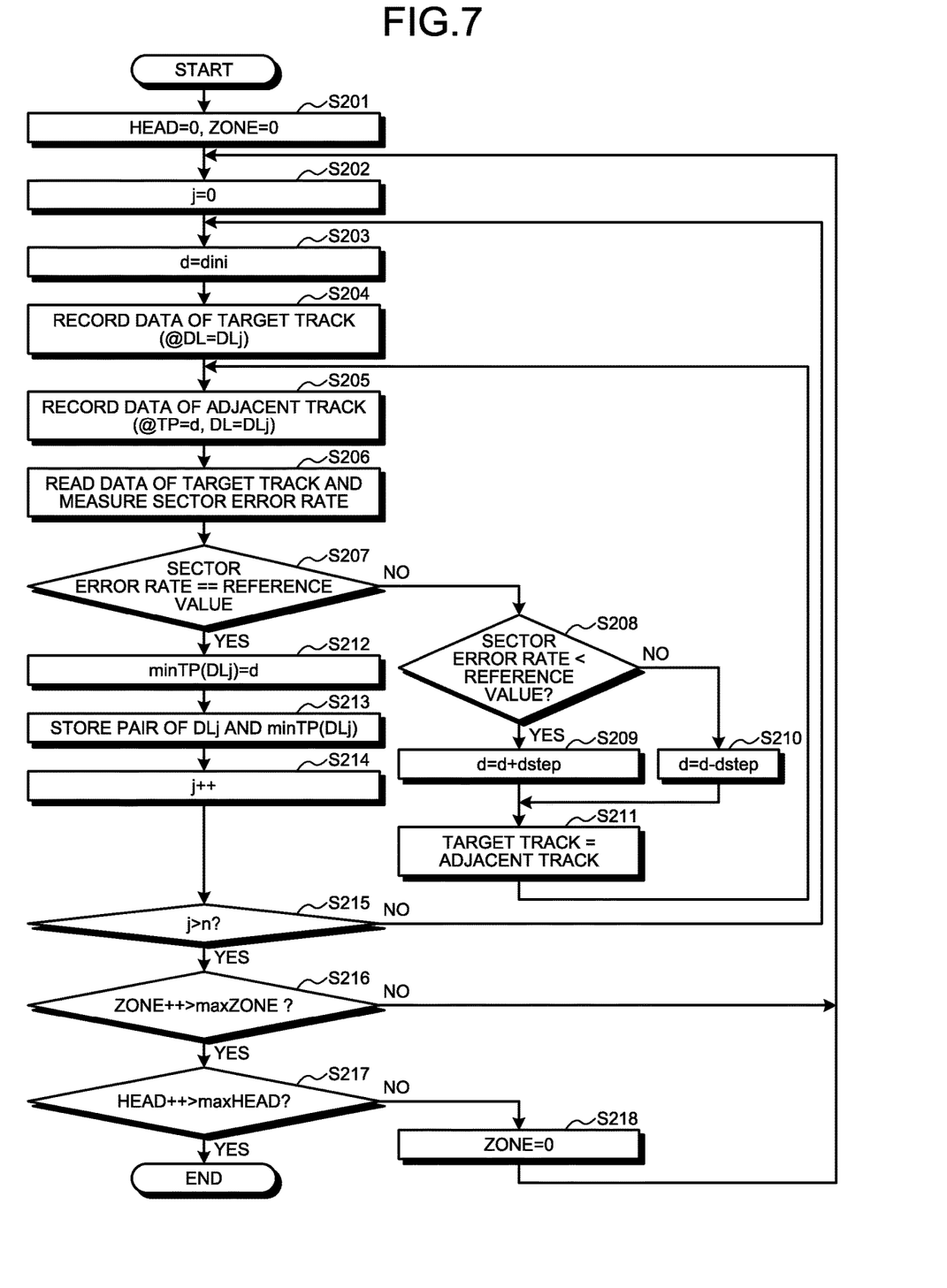
FIG. 7 is a flowchart illustrating the operation of S101 in the first embodiment in detail.

FIG. 7 is a flowchart illustrating the operation in S101 in detail in the first embodiment.

First, the MPU 25 initializes to zero a head number HEAD being an ID of the magnetic head 102 and a zone number ZONE being an ID of each zone 201 of each recording surface 200 (S201). In one example of the processing in FIG. 7, the zone 201 specified by a combination of the head number HEAD and the zone number ZONE is referred to as a target zone 201.

Then, the MPU 25 initializes a loop counter j to 1 (S202). The MPU 25 initializes a length parameter d to an initial value dini (S203). The initial value dini is preset, for example.

As an example, n values (DL1, DL2, . . . , DLn), which cover a settable linear recording density range, of the linear recording density are prepared in advance. The MPU 25 selects a value DLj from the values DL1 to DLn and records data of one track (referred to as a target track) in the target zone 201 while controlling the linear recording density to DLj (S204). The magnetic head 102 specified by the head number HEAD is used for recording the data in the target zone 201.

Then, the MPU 25 records data of another track (referred to as an adjacent track) at a location adjacent to the target track (S205). In S205, the MPU 25 records the data of the adjacent track so that the track pitch TP of the target track is equal to d.

Specifically, the MPU 25 controls the radial position of the magnetic head 102 specified by the head number HEAD to a position radially offset from the position in S204 by d, and executes the operation in S205. In data recording from inside to outside of the disk medium 101, the MPU 25 shifts the position of the magnetic head 102 outward. In data recording from outside to inside the disk medium 101, the MPU 25 shifts the position of the magnetic head 102 inward. Thereby, the track pitch TP of the target track can be made equal to d.

In S205, the MPU 25 also controls the linear recording density to DLj for the recording.

Then, the MPU 25 reads data from the target track and measures a sector error rate at the time of the data reading (S206).

The sector error rate refers to the number of bit errors in each sector. A method of measuring the sector error rate is not limited to a specific method. For example, the MPU 25 may control the ECC 27 to report the sector error rate when data is read.

Then, the MPU 25 determines whether or not the measured sector error rate is equal to a reference value (S207). The reference value corresponds to a minimum quality. In other words, in S207, the MPU 25 determines whether or not the quality of the data recorded in the target track and read therefrom satisfies a certain criterion. The sector error rate equal to the reference value is an example that the quality of the data recorded and read from the target track satisfies a certain criterion.

The reference value is set, for example, in accordance with error correctability of the ECC 27. If the sector error rate is less than or equal to a certain value, the error correction always succeeds, but if the sector error rate exceeds the value, success of the error correction cannot be ensured, the reference value is set to the certain value. A method of setting the reference value is not limited thereto.

When the sector error rate is not equal to the reference value (NO in S207), the MPU 25 determines whether or not the sector error rate is smaller than the reference value (S208).

When the sector error rate is smaller than the reference value (YES in S208), the MPU 25 increases the value of d by a certain step width dstep (S209). When the sector error rate is not smaller, i.e., larger than the reference value (NO in S208), the MPU 25 decreases the value of d by the certain step width dstep (S210).

A method of increasing and decreasing the value of d in S209 and S210 is not limited thereto. The MPU 25 may change the value of d by an arbitrary method.

After S209 or S210, the MPU 25 newly sets the adjacent track recorded in S204 as the target track (S211), and returns to S205.

When the sector error rate is equal to the reference value (YES in S207), the MPU 25 sets a current value of d as the track pitch limit for the linear recording density being DLj (S212).

The track pitch limit for the linear recording density being DLj is represented by minTP(DLj). At the linear recording density of DLj, the first shape is defined by minTP(DLj) and the bit pitch BPj at the time of the linear recording density of DLj. The bit pitch BPj at the linear recording density being DLj can be found by calculating a reciprocal of DLj. In other words, a pair of DLj and minTP(DLj) represents the first shape at the linear recording density of DLj, and corresponds to the first-shape information.

A representation of the first-shape information is not limited thereto. Any information from which the first shape can be derived can be employed as the first shape-information. For example, a combination of the linear recording density and the track density, a combination of the bit pitch and the track density, or a combination of the bit pitch and the track pitch can be employed as the first-shape information.

The MPU 25 stores a pair of DLj and minTP(DLj) in a certain memory region (for example, a temporary data region of the memory 26) in association with the target zone 201 (S213).

In S207, the MPU 25 may determine that the sector error rate is equal to the reference value, even if the sector error rate does not coincide with the reference value. For example, the MPU 25 may determine that the sector error rate is equal to the reference value if the sector error rate falls within a certain range including the reference value.

Subsequently to S213, the MPU 25 increments j by 1 (S214). Then, the MPU 25 determines whether or not the value of j exceeds n (S215).

The letter n represents the number of the values DL1 to DLn of the linear recording density which are prepared in advance. In the case of using all of DL1 to DLn, the value of j exceeds the number n (YES in S215). In this case, the MPU 25 increments the zone number ZONE by 1 and determines whether or not the zone number ZONE exceeds a maximum value maxZONE of the zone number (S216).

When the zone number ZONE does not exceed max-ZONE (NO in S216), the MPU 25 returns to S203.

When the zone number ZONE exceeds maxZONE (YES in S216), the MPU 25 increments the head number HEAD by 1 and determines whether or not the head number HEAD exceeds a maximum value maxHEAD of the head number (S217).

If the head number HEAD does not exceed maxHEAD (NO in S217), the MPU 25 initializes the zone number ZONE to zero (S218), and returns to S202.

When the head number HEAD exceeds maxHEAD (YES in S217), the operation in S101 ends.

As described above, when the sector error rate is less than the reference value, the MPU 25 re-executes recording and reading at a narrowed track pitch, searching for the track pitch (track pitch limit) at which the sector error rate becomes equal to the reference value. When the sector error rate exceeds the reference value, the MPU 25 re-executes recording and reading at a widened track pitch, searching for the track pitch limit.

The MPU 25 acquires the track pitch limit for each zone and for each candidate value of the linear recording density. Thus, through the series of operations illustrated in FIG. 7, the MPU 25 can acquire, as first information, the first-shape information (a pair of linear recording density and track pitch limit) for each of the n linear recording densities DL1 to DLn in each zone 201.

Returning to FIG. 6, after S101, the MPU 25 sets the value of the recording density on the basis of information (second information) on the second shape which is formed by adding the same areal margin to each unit region of the first shape (S102).

Figure 8:
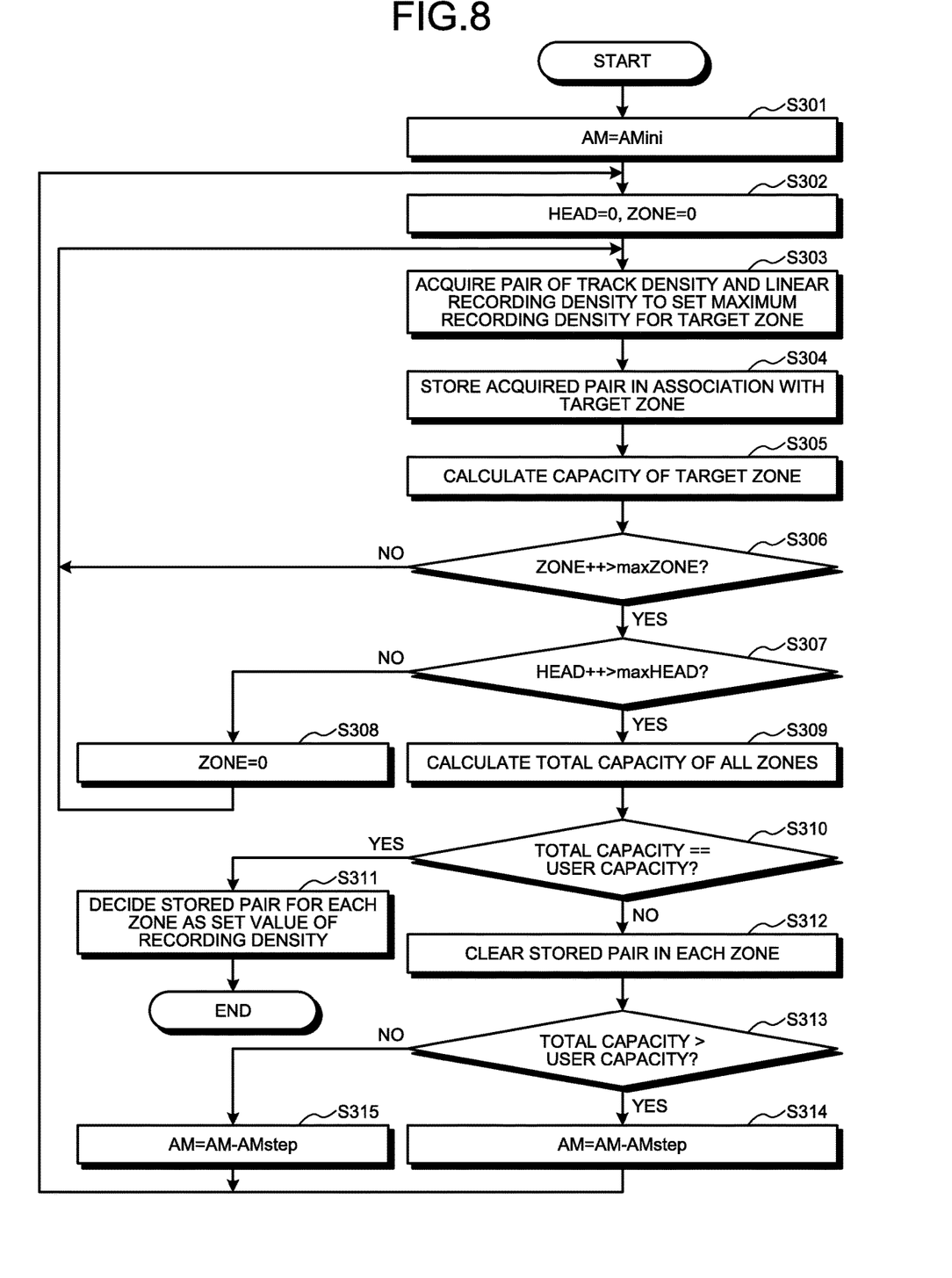
FIG. 8 is a flowchart illustrating the operation of S102 in the first embodiment in detail.

FIG. 8 is a flowchart illustrating the operation in S102 in detail in the first embodiment.

First, the MPU 25 initializes a parameter AM indicating a candidate value of the areal margin to an initial value AMini (S301). Then, the MPU 25 initializes the head number HEAD and the zone number ZONE to zero (S302). In one example of the processing in FIG. 8, the zone 201 specified by the head number HEAD and the zone number ZONE is referred to as a target zone 201.

Subsequently to S302, the MPU 25 acquires a combination of the track density and the linear recording density for the target zone 201 in which the recording density of the target zone 201, when the margin region of the area margin AM is assumed to be added to each unit region of the first shape, becomes to a maximum value (S303).

Figure 9:
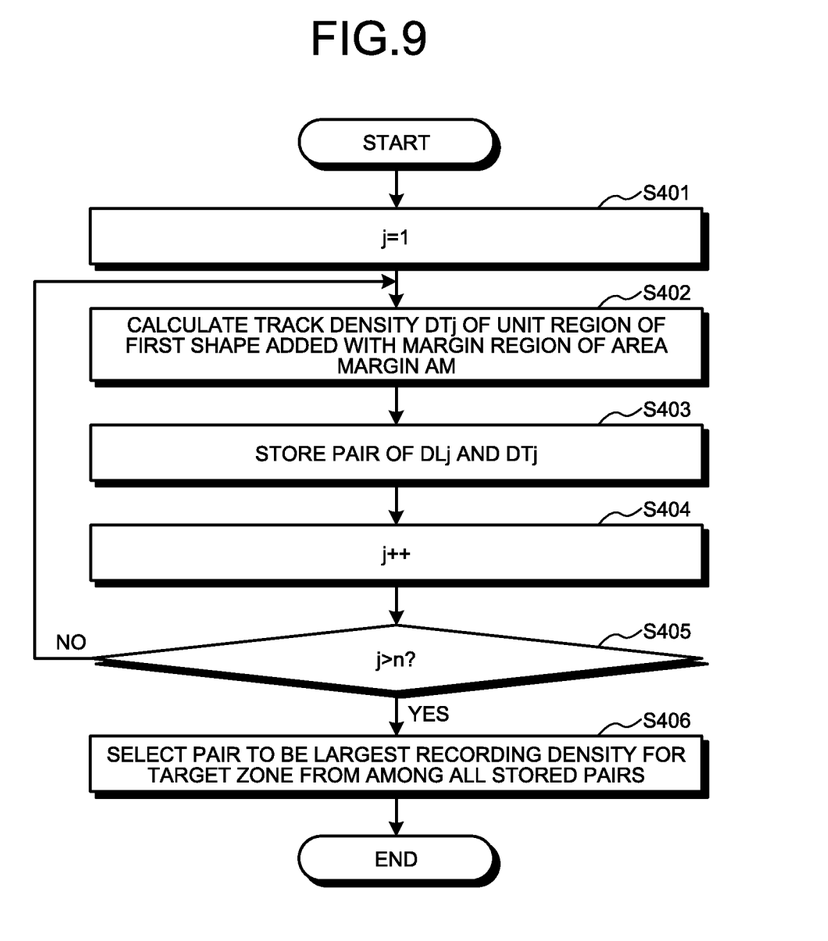
FIG. 9 is a flowchart illustrating the operation of S303 in the first embodiment in detail.

FIG. 9 is a flowchart illustrating the operation in S303 in detail in the first embodiment.

First, the MPU 25 initializes the loop counter j to 1 (S401). Then, the MPU 25 acquires the track pitch limit minTP(DLj) at the linear recording density being DLj from the first information obtained by the processing FIG. 7. Then the MPU 25 calculates the track density DTj in which the areal margin AM is assumed to be added to the unit region of the first shape indicated by a pair of DLj and minTP(DLj) (S402). In S402, the MPU 25 acquires the track pitch limit minTP(DLj) of the target zone 201.

Figure 10:
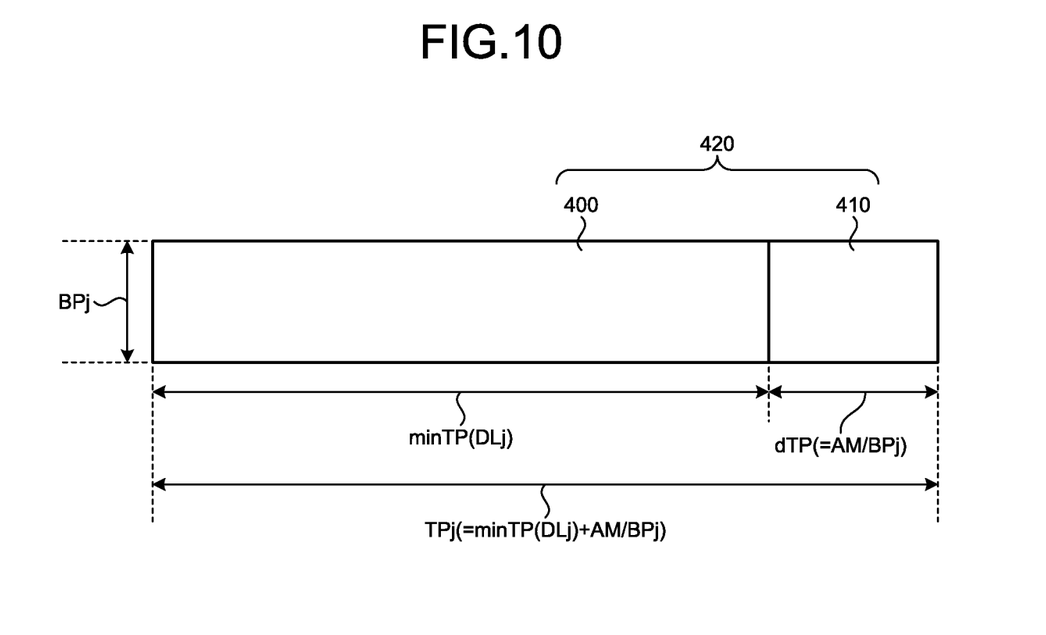
FIG. 10 is a diagram for illustrating the operation of S402 in the first embodiment in detail.

FIG. 10 is a diagram for illustrating the operation in S402 in detail in the first embodiment.

In FIG. 10, a rectangle 400 represents the first shape defined by the track pitch limit minTP(DLj) and the bit pitch BPj corresponding to the linear recording density DLj. The areal margin AM is added to the rectangle 400 in the radial direction of the disk medium 101. In other words, the second shape is a rectangle 420 created by radially extending the rectangle 400 by a length (denoted by dTP) corresponding to the area of AM.

An extended, added region 410 corresponds to the margin region, and the area of the region 410 is AM. Thus, the length dTP can be expressed by the following Formula (1):

$$dTP = AM/BPj.$$

The track pitch TPj of the second shape can be expressed by the following Formula (2):

$$TPj = minTP(DLj) + AM/BPj$$

The MPU 25 can find the track density DTj for the unit region of the first shape including the added areal margin AM, indicated by a pair of DLj and minTP(DLj), by calculating a reciprocal of the track pitch TPj found by Formula (2).

The rectangle 420 as the second shape is defined by a pair of bit pitch BPj and track pitch TPj. That is, the pair of the linear recording density DLj corresponding to the reciprocal of the bit pitch BPj and the track density DTj corresponding to the reciprocal of the track pitch TPj represents information on the rectangle 420 being the second shape.

In other words, the operation of S402 corresponds to acquiring the second-shape information at the areal margin being AM and the linear recording density being DLj.

The representation of the second-shape information is not limited thereto. Any information from which the second shape can be derived can be employed as the second-shape information. For example, a combination of the linear recording density and the track pitch, a combination of the bit pitch and the track density, or a combination of the bit pitch and the track pitch can be employed as the second-shape information.

Returning to FIG. 9, after S402, the MPU 25 increments j by 1 (S403). Then, the MPU 25 determines whether or not the value of j exceeds n (S404).

When the value of j does not exceed n (NO in S404), the MPU 25 returns to S402. When the value of j exceeds n (YES in S404), the MPU 25 selects, among the acquired combinations of the linear recording density DLi (where i is an integer of 1 to n) and the track density DTi acquired, a combination at which the recording density (a product of the track density and the linear recording density) for the target zone 201 becomes to be the maximum (S405). This completes the operation of S303.

As described above, the MPU 25 calculates the recording density for the target zone 201 in which the areal margin AM is added to each first shape, to thereby acquire a combination of the linear recording density and the track density to maximize the recording density.

Returning to FIG. 8, after S303, the MPU 25 stores the pair of the track density and the linear recording density acquired in S303 in a certain memory region (for example, a temporary data region of the memory 26) in association with the target zone 201 (S304). Then, the MPU 25 calculates the capacity of the target zone 201 at the pair of the track density and the linear recording density acquired in S303 (S305).

The MPU 25 increments the zone number ZONE by 1 and determines whether or not the zone number ZONE exceeds the maximum value maxZONE of the zone number (S306).

When the zone number ZONE does not exceed max-ZONE (NO in S306), the MPU 25 returns to S303.

When zone number ZONE exceeds maxZONE (YES in S306), the MPU 25 increments the head number HEAD by 1 and determines whether or not the head number HEAD exceeds the maximum value maxHEAD of the head number (S307).

When the head number HEAD does not exceed max-HEAD (NO in S307), the MPU 25 initializes the zone number ZONE to zero (S308), and the MPU 25 returns to S303.

When the head number HEAD exceeds the maxHEAD (YES in S307), the MPU 25 calculates a total capacity of the respective zones 201 (S309).

The MPU 25 determines whether or not the total capacity coincides with a user capacity (S310). When the total capacity is equal to the user capacity (YES in S310), the MPU 25 sets the pair of the linear recording density and the track density of each zone 201 stored in S304 as values of a pair of linear recording density and track density of each zone 201 (S311), ending the operation of S102.

When the total capacity is not equal to the user capacity (NO in S310), the MPU 25 clears the pair of linear recording density and track density of each zone 201 stored in S304 (S312), and determines whether or not the total capacity is larger than the user capacity (S313). When the total capacity is larger than the user capacity (YES in S313), the MPU 25 reduces AM by a certain step width AMstep (S314), and returns to the process of S302. In other words, the MPU 25 reduces the areal margin, and adjusts the pair of linear recording density and track density again.

When the total capacity is not larger i.e., smaller than the user capacity (NO in S313), the MPU 25 increases AM by a certain step width delta (S315), and returns to S302. Thus, the MPU 25 adjusts the pair of the linear recording density and the track density again with the increased areal margin.

In S310, the MPU 25 may determine that the total capacity is equal to the user capacity, even if the total capacity does not coincide with the user capacity. For example, the MPU 25 may determine that the total capacity is equal to the user capacity as long as the total capacity exceeds the user capacity and a difference between them is equal to or less than a certain value.

As described above, the recording density setting method of the first embodiment includes a first step (for example, S101) and a second step (for example, S102). In the first step, data is recorded on and read from the disk medium 101 (for example, S204 to S206), and the first information representing the first shape of the first unit regions, is acquired for setting the read data to satisfy a certain quality criterion (for example, S212 and S213). The first unit regions are recording regions of a unit capacity. In the second step, the second information representing the second shape, which is formed by adding the same area margin AMs to each unit region of the first shape, is acquired (for example, S304), to set the recording density on the basis of the second information (for example, S311).

A first example and a second example will be described for the purpose of comparison with the first embodiment. In the first example, the shape of the unit regions is set so that the bit error rate of the magnetic disk device becomes uniform and lowest. According to the second example, the shape of the unit regions is set so that the track pitch margin of the magnetic disk device becomes uniform and maximum.

However, the first example cannot ensure tolerance to overwriting, particularly, in the case of SMR data recording. The second example cannot ensure the margin of the bit error rate relative to the variation in the recording quality.

According to the recording density setting method of the first embodiment, the same areal margin is added to the first unit regions on the basis of the shape (first shape) that can ensure a minimum quality. In other words, the recording density is set so that the first unit regions include the same areal margin.

The areal margin is represented by a product of the bit pitch and the track pitch margin. It is thus possible to provide a high-quality magnetic disk device 1 which can ensure both the tolerance to the overwriting and the margin of the bit error rate in a balanced manner. In other words, according to the first embodiment, the quality of the magnetic disk device 1 can be improved.

The first unit regions are, for example, all the unit regions of the magnetic disk device 1. It is thus possible to make the areal margins of all the unit regions of the magnetic disk device 1 uniform. The first unit regions may be part of the unit regions of the magnetic disk device 1. For example, the first unit regions may be all the unit regions of part of all the zones 201 of the magnetic disk device 1. In this case, the areal margins of the part of the zones 201 can be made uniform.

In the above explanation, the recording region per bit is defined as the unit region. The definition of the unit region is not limited thereto. A recording region per two or more bits may be defined as the unit region.

Further, the second shape (for example, the rectangle 420 in FIG. 10) is created by extending the first shape (for example, the rectangle 400 in FIG. 10) in the radial direction of the disk medium 101 by the length corresponding to the areal margin AM.

The extended length corresponding to the areal margin AM serves as the track pitch margin. This can ensure the tolerance to the overwriting.

Further, the recording surfaces 200 of the disk medium 101 include the partial regions (for example, zones 201) each including unit regions. The first step includes acquiring the first shape for each partial region (for example, S201 to S215). The second step includes setting the recording density for each partial region (for example, S311).

Thus, the area margins of all the unit regions of the partial regions can be made uniform irrespective of different first shapes in the partial regions. This makes it possible to provide a magnetic disk device 1 in which the areal margin of the unit regions of one of two partial regions is made equal to that of the unit region of the other partial region, for example.

Further, the second step includes calculating the total capacities of the disk medium 101 while changing the areal margin (for example, S312 to S315 and S309), and setting the recording density on the basis of the total capacities and the user capacity of the magnetic disk device 1 (for example, S310 and S311).

This makes it possible to optimize the areal margin in accordance with the user capacity.

Further, when a largest total capacity not exceeding the user capacity among the total capacities is calculated, the recording density is set on the basis of the second shape corresponding to the largest total capacity (for example, S310 and S311).

Thus, the areal margin is maximized, and as a result, both the tolerance to the overwriting and the margin of the bit error rate to be balanced are achieved in a highly balanced manner.

The first step further includes acquiring first shapes having different ratios of the track pitch and the bit pitch. For example, as illustrated in FIG. 7, the values (DL1 to DLn) of the linear recording density are prepared in advance, to calculate the track pitch limit minTP for each value of the linear recording density. Thereby, the first shapes having different ratios of the track pitch and the bit pitch are acquired. In the second step, a first shape having the maximum recording density (that is, the product of the track density and the linear recording density) among the first shapes is acquired each time the candidate of the areal margin is changed (for example, S303 and S401 to S406), to calculate the total capacity on the basis of the acquired shapes (for example, S309).

Thus, it is possible to equalize and maximize the areal margins.

In the first step, the sector error rate is measured as an index representing the quality (for example, S206), to acquire the shape of the unit region having the measured sector error rate of a certain value (for example, S207, S212, and S213).

It is therefore possible to acquire the shape of the unit region for ensuring the minimum quality.

The sector error rate refers to the bit error rate per sector. A unit of the bit error rate measurement is not limited to sector alone. For example, the bit error rate per track may be measured.

According to the first embodiment, the magnetic disk device 1 records data by SMR by way of example. By SMR, the recording density can be improved by narrowing the track pitch than the width WHw of the recording element of the magnetic head 102. According to the first embodiment, the track pitch can be set with the margin up to the track pitch limit, which can ensure the minimum recording quality even in the situation that the magnetic head 102 is unintentionally offset in position during SMR recording.

The magnetic disk devices to which the technique of the first embodiment can be applied are not limited to the SMR recording devices. The technique of the first embodiment can also be applied to devices which record data in accordance with CMR or both SMR and CMR.

In the above description, the linear recording density and the track density of each zone 201 are set so as to equalize and enlarge the areal margins in the entire recording surfaces 200 as much as possible. In order to achieve uniform and constant recording quality on the entire recording surfaces 200, ideally, the areal margin is to be uniform and maximal in the entire recording surfaces 200. However, if larger quality deterioration is anticipated in a portion, indicated by a specific magnetic head 102, a specific zone 201, or a combination of the two, than in the rest of the recording surfaces 200, the areal margin does not need to be uniformly distributed. The areal margin may be proportionally distributed depending on a difference in the quality deterioration.

Examples of the factors of the difference in the quality deterioration include differences in the parts of the respective elements such as positioning accuracy when applied with vibration or impact, jitter caused by a difference in recording frequency, and amount of deterioration in a thermal fluctuation quality caused by non-uniform magnetic characteristics of the disk mediums 101. The factors of the difference in the quality deterioration are not limited thereto.

Upon selecting a specific zone 201 as the target zone 201, for example, the MPU 25 can distribute the areal margin by temporarily adjusting the areal margin AM immediately before S303. For another example, the MPU 25 can adjust the areal margin AM by adding a certain amount to the areal margin AM or multiplying the areal margin AM by a certain number. A distribution method of the areal margin is not limited thereto.

Second Embodiment

The first embodiment has described the example in which the MPU 25 of the magnetic disk device 1 sets the recording density. Alternatively, the magnetic disk device 1 may incorporate a dedicated hardware circuit that sets the recording density. The MPU 25 may decide the recording density in cooperation with the hardware circuit.

Figure 11:
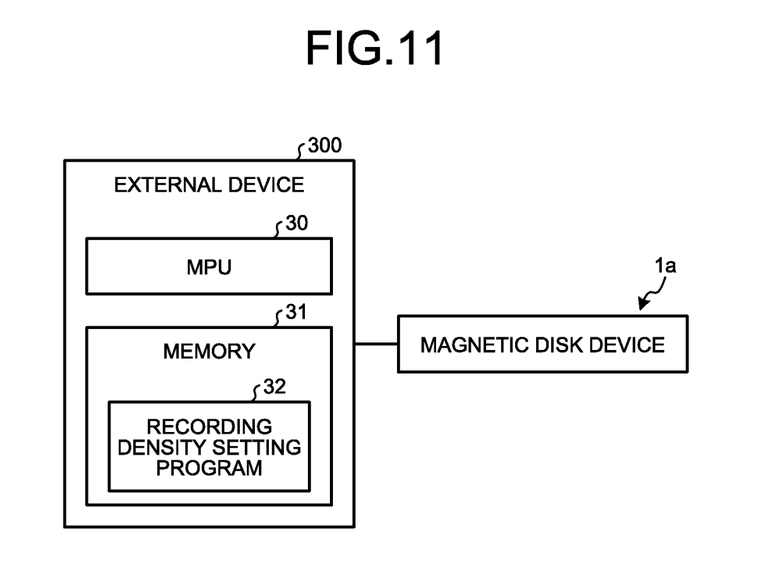
FIG. 11 is a diagram illustrating a system that executes a recording density setting method of a second embodiment.

Alternatively, as illustrated in FIG. 11, for example, the magnetic disk device 1 may be connected to an external device 300, and the external device 300 may control the hardware of the magnetic disk device 1 to set the recording density.

For example, the external device 300 represents a computer including a processor 30 and a memory 31. The recording density setting program 32 is stored in the memory 31 in advance. The processor 30 executes the recording density setting program 32 to set the recording density. The processor 30 sequentially transmits commands to the magnetic disk device 1 and implements the respective processes illustrated in FIGS. 7 to 9.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recording density setting method, comprising:
performing first process of recording and reading data on and from a disk medium of a magnetic disk device, acquiring first information for setting the read data to satisfy a certain quality criterion, the first information representing a first shape of a first plurality of unit regions, each of the a first plurality of unit regions being a recording region of a unit capacity; and
performing second process of acquiring second information representing a second shape of the first plurality of unit regions, and setting a recording density on the basis of the second information, the second shape being formed by adding margin regions having the same area to the first plurality of unit regions of the first shape.

2. The recording density setting method according to claim 1,
wherein the second shape is formed by extending the first shape in a radial direction of the disk medium by a length corresponding to the area.

3. The recording density setting method according to claim 2,
wherein the disk medium includes a recording surface including a plurality of partial regions each including a second plurality of unit regions among the first plurality of unit regions,
the first process includes acquiring the first shape for each partial region, and
the second process includes setting the recording density for each partial region.

4. The recording density setting method according to claim 2,
wherein the second process includes
performing third process of calculating a plurality of total capacities of the disk medium while changing the area, and
performing forth process of setting the recording density on the bases of the total capacities and a user capacity of the magnetic disk device.

5. The recording density setting method according to claim 4,
wherein the fourth process includes selecting a largest total capacity not exceeding the user capacity from among the total capacities and setting the recording density on the basis of the second shape corresponding to the selected total capacity.

6. The recording density setting method according to claim 4,
wherein the first process includes acquiring a plurality of third shapes, each of plurality of third shapes being the first shape, the plurality of third shapes differing in ratio between lengths in a radial direction and a circumferential direction of the disk medium, and
the third process includes
selecting, among a plurality of fourth shapes, each time the area is changed, a fifth shape exhibiting a largest product of a track density and a linear recording density, each of the plurality of fourth shapes being the second shape and being corresponding to each of the plurality of third shapes, and
calculating a total capacity on the basis of the fifth shape selected each time the area is changed.

7. The recording density setting method according to claim 2,
wherein the first process includes
measuring a bit error rate as quality of the read data, and
acquiring, as the first shape, a shape of the first plurality of unit regions having the measured bit error rate of a certain value.

8. The recording density setting method according to claim 2,
wherein the magnetic disk device records data on the disk medium by shingled magnetic recording.

9. The recording density setting method according to claim 1,
wherein the recording density is defined by a combination of a radial recording density and a circumferential recording density of the disk medium.

* * * * *